United States Patent [19]

Sasaki et al.

[11] Patent Number: 4,767,528
[45] Date of Patent: Aug. 30, 1988

[54] DRINKING WATER PURIFYING APPARATUS

[75] Inventors: Toshihiko Sasaki, Kobe; Keisuke Namba, Amagasaki; Naotoshi Matsunaga, Kobe; Masayuki Tanaka, Kobe; Norimitsu Ezaki, Kobe; Masaru Tanaka, Kobe; Hisashi Tonegawa, Kobe; Naomichi Mikajiri, Kobe; Hideo Motooka, Kobe; Toshikazu Honda, Kobe, all of Japan

[73] Assignee: Mitsubishi Denki Kabushiki Kaisha, Tokyo, Japan

[21] Appl. No.: 112,045

[22] Filed: Oct. 23, 1987

Related U.S. Application Data

[63] Continuation of Ser. No. 828,709, Feb. 12, 1986, abandoned.

[30] Foreign Application Priority Data

| Feb. 13, 1985 [JP] | Japan | 60-27628 |
| Feb. 13, 1985 [JP] | Japan | 60-27627 |
| Feb. 13, 1985 [JP] | Japan | 60-27630 |
| Feb. 13, 1985 [JP] | Japan | 60-27629 |
| Feb. 13, 1985 [JP] | Japan | 60-27625 |

[51] Int. Cl.$^4$ .............................................. C02F 1/78
[52] U.S. Cl. ........................ 210/177; 210/181; 210/192; 210/205; 210/257.1
[58] Field of Search ............... 210/760, 764, 177, 180, 210/181, 192, 205, 251, 257.1, 258

[56] References Cited

U.S. PATENT DOCUMENTS

| 4,019,986 | 4/1977 | Burris et al. | 210/192 X |
| 4,029,578 | 6/1977 | Turk | 210/760 |
| 4,136,027 | 1/1979 | Sakamoto et al. | 210/760 |
| 4,352,740 | 10/1982 | Grader et al. | 210/760 |
| 4,552,659 | 11/1985 | Tabata et al. | 210/177 |

OTHER PUBLICATIONS

Ozone Provides Alternative for Secondary Effluent Disinfection.

Primary Examiner—Tom Wyse
Attorney, Agent, or Firm—Oblon, Fisher, Spivak, McClelland & Maier

[57] ABSTRACT

A drinking water purifying apparatus for purifying water from a water service comprises an ozone generating means for producing ozonized gas, an ozone reaction means for reacting the ozonized gas from the ozone generating means with the water from a water service, and a treating means for treating the water obtained by reaction to the ozonized gas in the ozone reaction means, whereby drinking water being free from organic compounds and smelling substances and having good taste can be obtained.

13 Claims, 5 Drawing Sheets

DRINKING WATER PURIFYING APPARATUS

This application is a continuation of application Ser. No. 06/828,709, filed on Feb. 12, 1986, now abandoned.

The present invention relates to a drinking water purifying apparatus. More particularly, it relates to a drinking water purifying apparatus using ozone to purify water to thereby providing healthy water.

Figure 11:
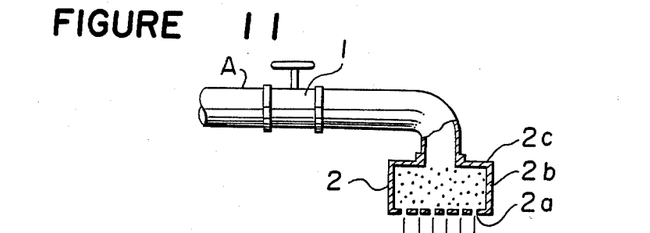
FIG. 11 is a schematic view showing a conventional drinking water purifying device.

FIG. 11 shows a conventional drinking water purifying device to which an end of a water pipe A such as a pipe for water service, provided with a water tap 1 is connected. The device 2 comprises a casing 2b having a bottom surface with a number of small orifices 2a and activated carbon 2c packed in the casing.

In the conventional drinking water purifying device, the adsorbing capacity of the activated carbon 2c packed in the casing 2b is limited and it is necessary to replace the activated carbon at a predetermined interval of time. If the replacement of the carbon is too late, bacteria in water deposit the activated carbon 2c, whereby the carbon may become a source of cultivation for the bacteria. Further, when, for instance, silver-deposited carbon is used to carry out sterilization of water, adverse affect may be caused to the human body by dissolving of silver from the silver-deposited carbon. Further, when the conventional drinking water purifying device 2 is used in the summer season, water of good taste can not always be obtained because the temperature of water is relatively high.

Figure 12:
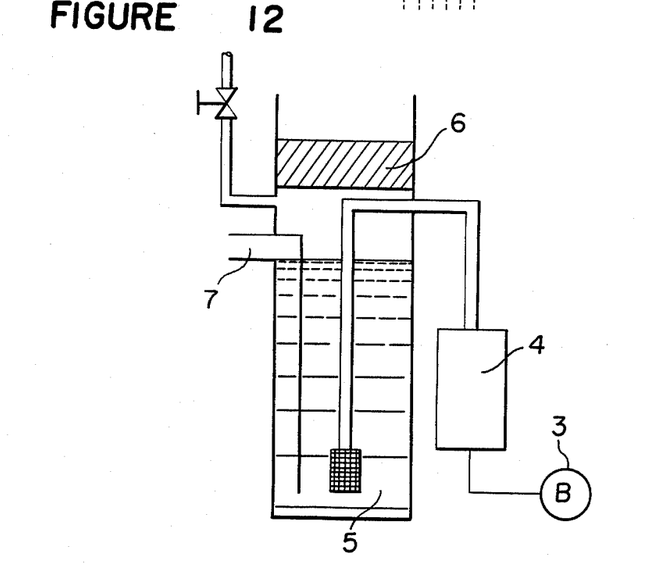
FIG. 12 is a diagram showing a separate conventional drinking water purifying apparatus.

In order to improve the disadvantage of the drinking water purifying device using activated carbon, there have been proposed drinking water purifying apparatuses utilizing a strong oxidizing effect of ozone, in publications such as Japanese Unexamined Patent Publication No. 156491/1984 (Patent Application Serial No. 29560/1983) and Japanese Unexamined Patent Publication No. 156492/1984 (Patent Application Serial No. 32563/1983). FIG. 12 shows a typical construction of the apparatus which comprises a blower 3 for feeding air to be ozonized, an ozone generator 4, an exposure vessel 5, an ozone decomposing device 6 and a faucet 7.

Air forcibly supplied from a blower 3 for feeding air to be ozonized is introduced in the ozone generator 4 where it is converted into ozone-containing gas. The gas is dispersed into water in the exposure vessel 5. Ozone in the ozone-containing gas oxidizes and decomposes organic compounds and foul smelling substances dissolved in the water. Then, the treated water is taken out the faucet 7 to be used for beverage.

However, good drinking water can not always be obtained by merely removing the organic compounds and foul smelling substances.

It is an object of the present invention to eliminate the disadvantage of the conventional device and to provide a drinking water purifying apparatus for quickly producing good and hygienic water for beverages by subjecting water to be purified to sterilization and deodorization by ozonized gas and thereafter, by subjecting the purified water to a suitable treatment without using activated carbon for purification.

The foregoing and the other objects of the present invention have been attained by providing a drinking water purifying apparatus for purifying water from a water service which comprises an ozone generating means for producing ozonized gas, an ozone reaction means for reacting the ozonized gas from the ozone generating means with the water from a water service, and a treating means for treating the water obtained by reaction to the ozonized gas in the ozone reaction means to rapidly reduce a dissolved ozone concentration therein.

DETAILED DESCRIPTION OF THE PREFERRED EMBODIMENTS

Preferred embodiments of the present invention will be described with reference to the accompanying drawings.

Figure 1:
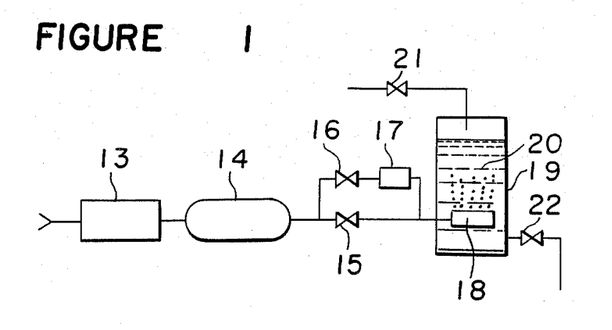
FIG. 1 is a diagram showing a first embodiment of the drinking water purifying apparatus according to the present invention.

FIG. 1 illustrates the first embodiment of the present invention. In FIG. 1, a reference numeral 13 designates an air supplying device, a numeral 14 designates an ozone generator, a numeral 15 a switching valve provided in a line for feeding ozonized gas to an ozone reaction containing device 19, a numeral 16 a switching valve provided in a line for feeding dissolved ozone removing gas such as sterilized air to the ozone reaction device 19, the dissolved ozone removing gas being produced by passing the ozonized gas in an ozone decomposing and purifying device 17, a numeral 18 designates a gas dispersion device for dispersing the ozonized gas or the dissolved ozone removing gas obtained by passing the ozonized gas through the ozone decomposing and purifying device 17, a numeral 20 designates water supplied from a water feeding means provided with a stop valve 21, and a numeral 22 designates a valve provided in a discharging device for taking out drinking water thus produced.

Figure 2:
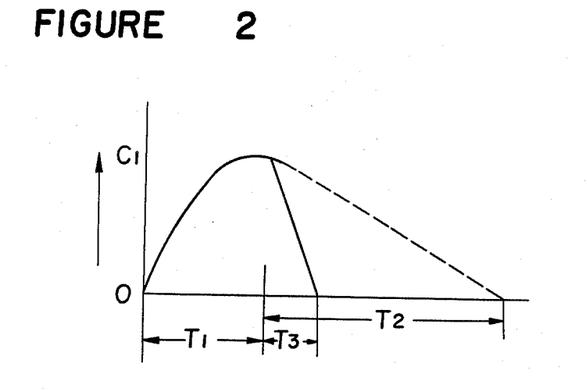
FIG. 2 is a graph showing attenuation characteristics in which there are shown natural attenuation characteristic and rapid attenuation characteristic obtained by using air purified and sterilized in an ozone decomposing and purifying device for removing dissolved ozone.

FIG. 2 is a graph showing the relation between concentration of dissolved ozone obtained by exposure of ozonized gas to water for a time period of $T_1$ and attenuation characteristic of the dissolved ozone, in which $T_2$ represents time from exposure of the ozonized gas to disappearance of ozone due to natural attenuation and T₃ represents time required for disappearance of ozone due to its attenuation in case that the ozonized gas is exposed and then the dissolved ozone removing gas is exposed.

Air to be used for producing the ozonized gas is supplied form the air supplying device 13 to the ozone generator 14, and the ozonized gas is fed into the ozone reaction device 19 through the valve 15 and the dispersion device 18. Exposure of the ozonized gas is carried out for the water to be treated 20 contained in the ozone reaction device 19 for a time $T_1$ required for sterilization and deodorization as shown in FIG. 2. After completion of exposure of the ozonized gas, the valve 15 is closed and the valve 16 is opened. Then, the ozonized gas is supplied to the ozone decomposing and purifying device 17 containing an ozone-decomposing catalyst, and thereafter, the gas subjected to decomposition of ozone is supplied to the gas dispersion device 18 to be exposed for a time $T_3$ required to remove the dissolved ozone. The drinking water thus produced can be supplied through the valve 21.

In the above-mentioned embodiment, the ozonized gas from the ozone decomposing and purifying device is used to rapidly remove the dissolved ozone. However, it is possible that a device for the dissolved ozone removing gas is separately provided; air treated by an ultraviolet ray for sterilization is used, and air is exposed to the dissolved ozone-containing water for a time $T_3$ to carry out sterilization of the air by the dissolved ozone. In this case, it is preferable to use sterilizing gas. A gas dispersion device may be provided separate from the gas dispersion device for dispersing the ozonized gas.

Air is used as a raw material to produce the ozonized gas; however, the same effect can be attained by using oxygen which produces ozone.

Figure 3:
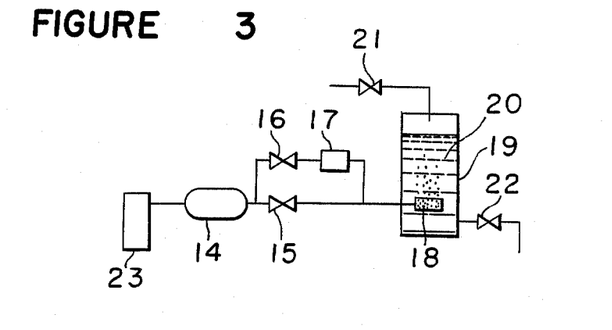
FIG. 3 is a diagram showing a second embodiment of the present invention in which an oxygen container is used as an ozone source.

FIG. 3 shows the second embodiment of the drinking water purifying apparatus according to the present invention. The construction of the apparatus shown in FIG. 3 is the same as that in FIG. 1 provided that an oxygen container 23 is used instead of the air supplying device 13.

With the construction as shown in FIG. 3, efficiency of the ozone generator is several times higher than the case of using air. Accordingly, it is unnecessary to provide a moisture removing device to reduce the dew point in the ozone generator, whereby the entire apparatus can be small-sized, compact and inexpensive.

Figure 4:
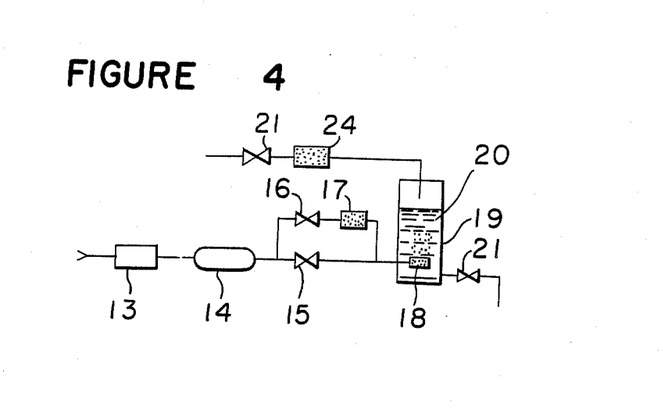
FIG. 4 is a diagram showing a third embodiment of the present invention in which a device for separating and decomposing substances difficult to decompose and remove by ozone, is used.

FIG. 4 illustrates the third embodiment of the present invention. In the embodiment shown in FIG. 4, a reference numeral 24 designates a separation and decomposition column for removing substances which can not be decomposed and removed by ozone. The separation and decomposition column 24 is provided at the front stage of the ozone reaction device to remove the substances and not to reduce effect of sterilization by the ozone. Even though the separation and decomposition column is preferably placed at the front stage of the ozone reaction device, it may be provided at the rear stage of the ozone reaction device. The construction of the third embodiment is the same as that of the first embodiment except for the provision of the column 24. In the third embodiment, dust and chemical compounds which can not be removed by the ozone can be separated and decomposed whereby more purified drinking water can be obtained.

In the following, effect obtained by using the above-mentioned embodiments will be described.

Water from a water service having 8.0 degree of concentration of smell, 9 degree of chromaticity, pH 7.6, 0.1 mg/liter or lower of ammonia, 0.01 mg/liter or lower of nitrate, 0.1 mg/liter or lower of nitride, 4.9 mg/liter of consuming rate of potassium permanganate, 0.28 mg/liter or lower of iron, 0.03 mg/liter of manganese and 31.1 mg/liter of T-THM (tripamethane) was used. The water was treated by dispersing ozone in the apparatus shown in FIG. 1. The results are shown in Table b 1.

TABLE 1

| Time of ozone dispersion (min) | Amount of consumed O₃ (mg/l) | Efficiency of absorption (%) | pH (—) | Chromaticity (degree) | Amount of consumed KMnO₄ (mg/l) | Concentration of smell (degree) | T-THM (µg/l) | Residual salts (mg/l) |
|---|---|---|---|---|---|---|---|---|
| 0 | — | — | 7.6 | 9 | 4.9 | 8.0 | 31.1 | 0.1 or lower |
| 1.0 | 0.88 | 48.2 | 7.4 | 7 | 4.3 | 4.2 | 21.0 | 0.1 or lower |
| 2.0 | 1.24 | 34.1 | 7.3 | 7 | 4.3 | 3.5 | 20.9 | 0.1 or lower |
| 3.5 | 2.44 | 38.3 | 7.4 | 5 | 4.2 | 3.0 | 18.6 | 0.1 or lower |
| 7.0 | 4.30 | 33.7 | 7.4 | 4 | 3.9 | 3.0 | 18.2 | 0.1 or lower |
| 30.6 | 16.0 | 28.7 | 7.3 | 3 | 3.5 | 1.2 | 12.3 | 0.1 or lower |

Seven minutes after the initiation of ozone dispersion, the concentration of smelling was changed from 8.0 degree to 3.0 degree, the chromaticity was changed from 9 degree to 4 degree and T-THM was changed from 31.1 µg/liter to 18.2 µg/liter.

Time of natural attenuation of the dissolved ozone was measured. The results are shown in Table 2.

TABLE 2

| Time (min) | 0 | 0.5 | 1.0 | 2.0 | 5.0 | 10.0 | 20 | 40 | 60 | After 24 hours |
|---|---|---|---|---|---|---|---|---|---|---|
| Dissolved ozone (mg/l) | 2.05 | 1.99 | 1.94 | 1.74 | 1.55 | 1.37 | 1.12 | 1.04 | 0.93 | 0.22 |

It is apparent from Table 2, the method of natural attenuation of the ozone was not suitable for rapid purification of drinking water because 0.22 mg/liter of the dissolved ozone remains after it had been left for 24 hours.

On the other hand, the method of removing the dissolved ozone by sterilizing air was used for measurement. The results of measurement are shown in Table 3.

TABLE 3

| | Time of dispersion of sterilized air (min) | | | | | | |
|---|---|---|---|---|---|---|---|
| | 0 | 0.5 | 1.0 | 2.0 | 5.0 | 10.0 | 20.0 |
| Dissolved ozone | 2.39 | 2.21 | 1.66 | 1.72 | 0.44 | 0.06 | 0.037 |
| " | 0.73 | 0.70 | 0.47 | 0.30 | 0.09 | 0.037 | — |
| " | 0.59 | 0.54 | 0.22 | 0.16 | 0.09 | 0.03 | — |

The Table 3 shows that ozone in water of 2.39 mg/liter of supersaturated dissolved ozone can be reduced to be 0.37 mg/liter at 20 minutes after the exposure, which is almost negligible. Although the result depends on the temperature of water, ozone dissolved in water is ordinary about 0.5 mg/liter, and it can be removed at ten minutes after the exposure under the above-mentioned condition.

When thus obtained water is purified by using the apparatus of the present invention, the water is activated by sterilizing air thereby providing good drinking water. In addition, tripamethane harmful to the human body can be effectively reduced.

In accordance with the above-mentioned embodiments, sterilization and deodorization of water is carried out by ozone having a strong oxidization, and ozone dissolved in the water can be rapidly removed by the sterilizing and purifying air as the dissolved ozone removing gas, whereby hygienic and good drinking water can be promptly supplied.

Figure 5:
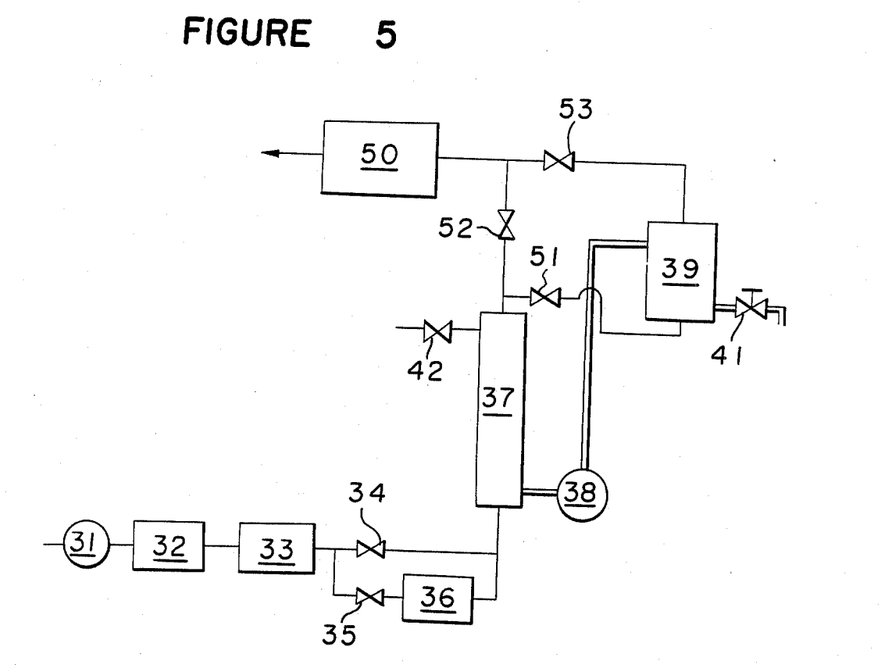
FIG. 5 is a diagram showing a fourth embodiment of the drinking water purifying apparatus according to the present invention.

The fourth embodiment of the drinking water purifying apparatus of the present invention will be described with reference to FIG. 5.

A reference numeral 31 designates a blower for feeding air to be treated, a numeral 32 designates an air drying device, a numeral 33 designates an electric discharging type ozone generator, numerals 34, 35 designate switching valves or electromagnetic valves, numerals 36, 50 designate ozone decomposing devices in which material having ozone decomposing function is packed, a numeral 37 designates an exposure vessel, a numeral 39 designates a water storage tank for containing ozone-treated water, a numeral 38 designates a pump for supplying the ozone-treated water to the water storage tank, a numeral 41 designates a faucet for purified drinking water, a numeral 42 designates a gate valve or an electromagnetic valve for feeding water to be treated to the exposure vessel, a numeral 51 designates a gate valve or an electromagnetic valve interposed in a pipe for connecting the exposure vessel 37 to the water storage tank 39, a numeral 52 designates a gate valve or an electromagnetic valve interposed in a pipe for connecting the exposure vessel 37 to the ozone decomposing device 50, and a numeral 53 designates a gate valve or an electromagnetic valve interposed in a pipe for connecting the water storage tank 39 to the ozone decomposing device 50.

Air forcibly supplied from the blower 31 is introduced into the air drying device 32 where it is dried to have a drew point of −20° C. or lower, and the dried air is introduced in the ozone generator 33 where a part of oxygen in the air is converted into ozone by electric discharge to become ozonized air. The ozonized air is introduced through the switching valve or electromagnetic valve 34 to the exposure vessel 37 containing water to be treated which has been previously introduced through the switching valve or electromagnetic valve 42, whereby ozone in the ozonized air is dissolved in the water to thereby decomposing substances causing bad smell and taste, organic compounds and oxidizing chlorine. Upon completion of exposure of ozone, the switching valve or electromagnetic valve 34 is closed and the switching valve or electromagnetic valve 35 is opened to introduce the ozonized air into the ozone decomposing device 36 where ozone in the ozonized air is decomposed. The resulting ozone-decomposed air is introduced in the exposure vessel 37 whereby ozone remaining in the ozone-treated water is completely removed. Then, the blower 31, the air drying device 32 and the ozone generator 33 are stopped and the switching valves or electromagnetic valves 34, 35 are closed.

The ozone-containing gas discharged from the exposure vessel 37 is supplied through the switching valve or electromagnetic valve 52 to the ozone decomposing device 50, in which ozone in the ozone-containing gas is completely decomposed and removed, and the gas subjected to decomposition of ozone is discharged out of the system. In this case, the switching valves or electromagnetic valves 51, 53 are closed. Thus, the ozone-free water is fed to the water storage tank 39 by means of the pump 38 to be supplied through the faucet 41. When the quantity of water in the water storage tank 39 becomes small, drinking water is produced by repeating the above-mentioned operations. On the other hand, the ozone-containing gas in the exposure vessel 37 is supplied to the water storage tank 39 at a predetermined time interval by opening and closing the switching valves or electromagnetic valves 51, 53. In this case, the switching valve or electromagnetic valve 52 is closed. A rate of supply of the ozone-containing gas is determined by controlling the time of opening of the switching valves or electromagnetic valves 51, 53. In this case, it is preferable that concentration of ozone in water is controlled to be in a range from 0.01 mg/liter to 0.2 mg/liter in conformity of the quantity of water in the water storage tank 39.

In the fourth embodiment of the present invention, since sterilized gas is supplied to the water storage tank 39, there is no breeding of bacteria entering from an air drain hole for introducing the outer air.

As a gas not containing ozone for reducing the content of the dissolved ozone, the outer air may be used as it can attain the same effect.

The fourth embodiment eliminates such disadvantage that water containing dissolved ozone, i.e. ozone having bad smell and a strong oxidization is used for beverage even though inorganic compounds and smelling substances are removed by a purifying device. The fourth embodiment of the present invention provides good drinking water in which residual ozone is removed as well as organic compounds, smelling substances and bacteria. In this connection, it has been known that ozone dissolved in water decomposes itself, and the half-life time of the decomposition of ozone is from several tens of minutes to several hours in clean water such as service water.

Figure 6:
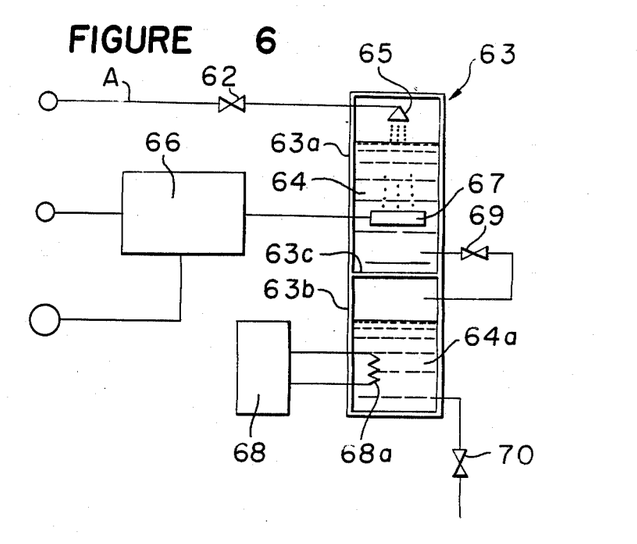
FIG. 6 is a diagram showing a fifth embodiment of the present invention.

FIG. 6 shows the fifth embodiment of the drinking water purifying apparatus.

A tank 63 is divided by a partition plate 63c into an upper ozone reaction chamber 63a and a lower water warming chamber 63b. At the upper part of the ozone reaction chamber 63a, there is provided a shower member 65 for supplying water to be treated 64 from a pipe A having a water tap 62. An exposure nozzle 67 is provided at the bottom of the ozone reaction chamber 63a to expose ozone supplied from an ozone generating device 66 to the water to be treated 64. A reference numeral 68 designates a power source for supplying a power to a heater 68a which heats water to be treated 64a in the water warming chamber 63b, a numeral 69 designates a valve for feeding the water 64a treated by the ozone reaction chamber 63a to the water warming chamber 63b, and a numeral 70 designates a water valve for discharging the treated water 64a heated in the water warming chamber 63b.

In the fifth embodiment of the present invention, water 64 supplied to the ozone reaction chamber 63a of the tank 63 is subjected to sterilization and deodorization by ozone fed from the ozone generating device 66, and then, is introduced in the water warming chamber 63b through the valve 69, in which the water is heated by the heater 68a to be at a predetermined temperature; thus treated water 64a is discharged through the water valve 70 to be used as hot water for beverage.

In the fifth embodiment, since water subjected to sterilization and deodorization is heated by the heater, hygienic and good drinking water can be provided.

Figure 7:
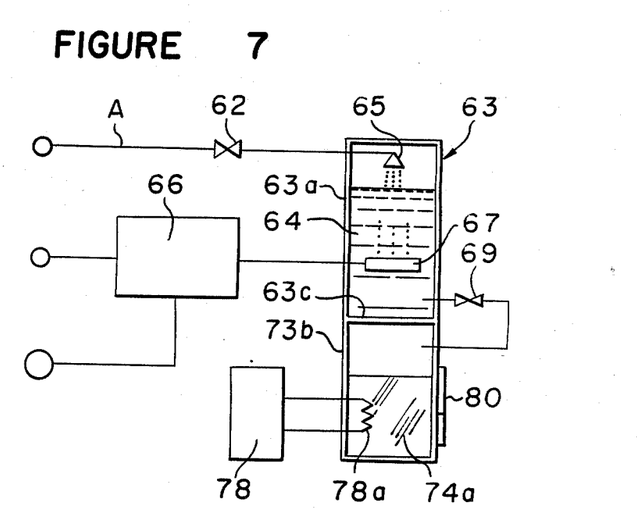
FIG. 7 is a diagram showing a sixth embodiment of the present invention.

The sixth embodiment of the drinking water purifying apparatus of the present invention will be described with reference to FIG. 7. In FIG. 7, the same reference numerals as in FIG. 6 designate the same parts and therefore, description of these parts is omitted. An ice producing chamber 73b is formed in the lower section which is defined by the partition plate 63c in the tank 63, a refrigerating coil 78a is provided in the ice producing chamber 73b and a refrigerant is supplied from a refrigerating device 78 to the refrigerating coil 78a. A reference numeral 69 designates a valve for supplying water treated in the ozone reaction chamber 63a to the ice producing chamber 73b, and a numeral 80 designates a discharging door for discharging pieces of ice 74a produced in the ice producing chamber 73b. In the sixth embodiment of the present invention, water 64 supplied from the ozone reaction chamber 63a of the tank 63 is subjected to sterilization and deodorization by ozone fed from the ozone generating device 66. The treated water is then introduced through the valve 69 into the ice producing chamber 73b where it becomes ice 74c by the refrigerating coil 78a. Thus produced ice 74a is supplied through the discharging door 80.

According to the sixth embodiment of the present invention, after sterilization and deodorization of water, the water is introduced in the ice producing chamber so as to produce pieces of ice whereby hygienic and good pieces of ice can be produced.

Figure 8:
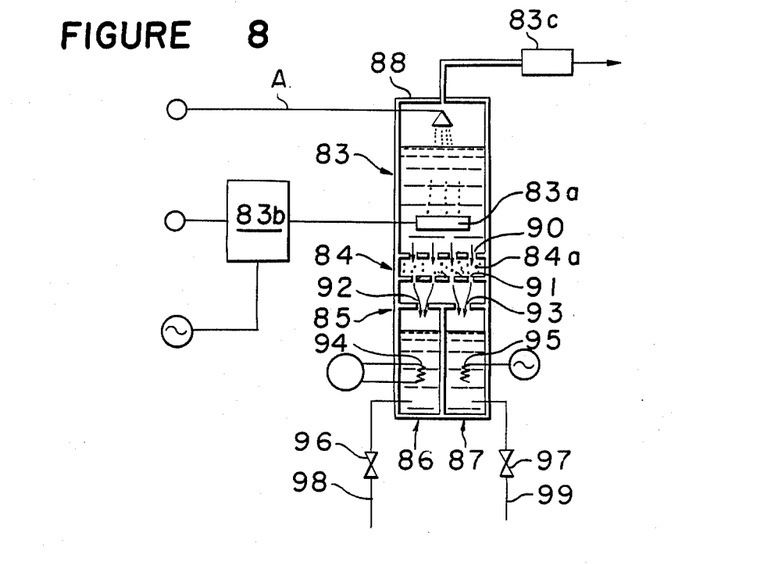
FIG. 8 is a diagram showing a seventh embodiment of the present invention.

FIG. 8 shows the seventh embodiment of the present invention.

In FIG. 8, a reference numeral 83 designates an ozone reaction chamber, a numeral 84 designates an ozone adsorption chamber, a numeral 85 designates a distribution chamber, a numeral 86 designates a cooling chamber, and a numeral 87 designates warming chamber, all of which are arranged in a single casing 88. Namely, the ozone reaction chamber 83 is provided at the upper part and the ozone adsorption chamber 84 and the distribution chamber 85 are provided at the lower part of the ozone reaction chamber 83 in this order. The cooling chamber 86 and warming chamber 87 are provided in parallel at the lower part of the distribution chamber 85.

In the seventh embodiment of the present invention, water is supplied from the water pipe A to the ozone reaction chamber 83. Ozone is discharged through the exposure nozzle 83a provided at the lower part of the ozone reaction chamber 83 so that ozone is reacted with the water to produce ozone-treated water. A reference numeral 83b designates an ozone generating device for feeding ozone to the exposure nozzle 83a, and a numeral 83c designates an ozone discharging device for discharging non-reacted ozone in the atmosphere. In the ozone-treated water, sterilization and deodorization are performed by the ozone having strong oxidization effect.

The ozone adsorption chamber 84 is packed with the activated carbon 84a so that residual ions remaining in the ozone-treated water are adsorbed on the activated carbon 84a when the water flowing from apertures 90 is passed through the ozone adsorption chamber 84. Thus produced purified water free from the residual ions is introduced in the distribution chamber 85 through apertures 91 and then, introduced to the cooling chamber 86 and the warming chamber 87. A reference numeral 92 designates an opening for communicating the distribution chamber 85 with the cooling chamber 86, and a numeral 93 designates an opening for communicating the distribution chamber 85 with the warming chamber 87.

A cooling device 94 is provided in the cooling chamber 86 to cool the purified water in the cooling chamber. On the other hand, a heater 95 is provided in the warming chamber 87 to warm the purified water in the warming chamber 87. A water pipe provided with a valve 96 is connected to the cooling chamber 86, and a water pipe 99 provided with a valve 97 is connected to the warming chamber 87. When the valve 96 is opened, purified cool water can be taken out from the water pipe 98, and when the valve 97 is opened, purified hot water can be taken out from the water pipe 99, respectively.

Figure 9:
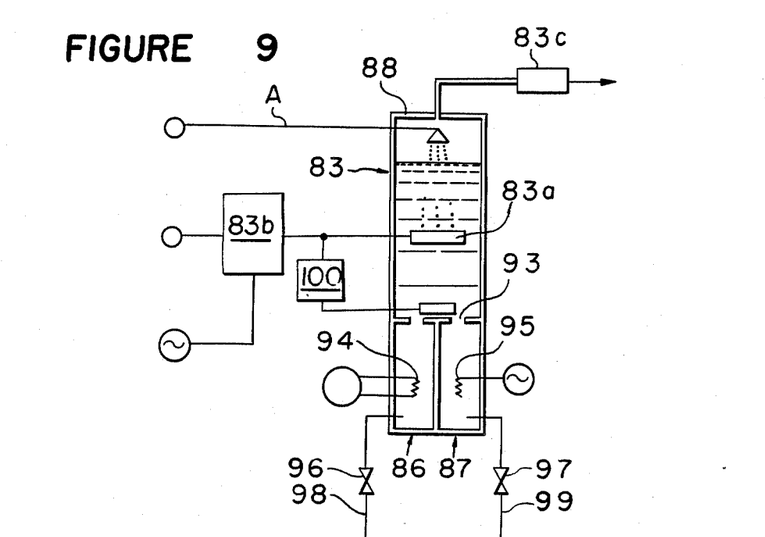
FIG. 9 is a diagram showing an eighth embodiment of the present invention.

In the seventh embodiment, it is possible that instead of provision of the distribution chamber 85, the ozone adsorption chamber 84 is connected to the cooling chamber 86 and the warming chamber 87 by means of water pipes. Further, for the activated carbon to remove residual ions in the ozone-treated water, the construction of the eighth embodiment as shown in FIG. 9 may be employed in which a part of ozonized air is passed through an ozone decomposing device 100 to obtain sterilized air, and the air is exposed at the lower part of the ozone reaction chamber 83 to remove the residual ions.

In the seventh and eighth embodiments of the present invention, sterilization and deodorization of the drinking water is performed by ozone and the residual ions are also removed, whereby hygienic and good drinking water can be served as either cooled water or warmed water.

Figure 10:
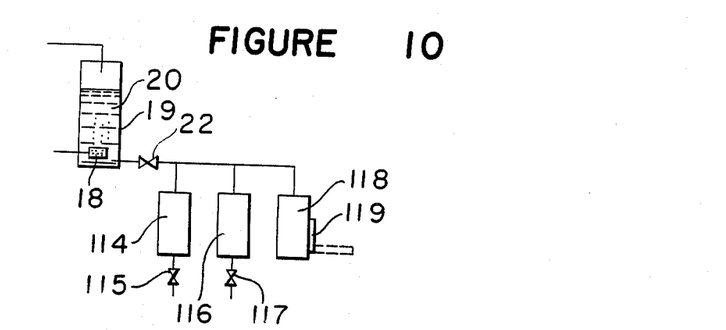
FIG. 10 is a diagram showing a ninth embodiment of the present invention.

FIG. 10 shows the ninth embodiment of the present invention. In FIG. 10, the same reference numerals as in FIGS. 1 to 4 designate the same parts. In FIG. 10, a reference numeral 114 designates a cool water producing device, a numeral 115 designates a discharge valve for cool water, a numeral 116 designates a warm water producing device, a numeral 117 designates a discharge valve for warm water, a numeral 118 designates an ice producing device, and a numeral 119 designates a door for discharging pieces of ice.

The operation of the apparatus shown in FIG. 10 will be described. The drinking water produced in the same manner as the apparatus in FIG. 1, is introduced to the cool water producing device 114, warm water producing device 116 and the ice producing device 118 by opening the valve 22; the drinking water in the cool water producing device 114 is discharged as cooled water through the valve 114; the drinking water in the warm water producing device 116 is discharged as warm water through the valve 117, and drinking water in the ice producing device 118 is taken out as pieces of ice through the door 119.

In the ninth embodiment shown in FIG. 10, water is subjected to sterilization and deodorization by ozonized gas, and thus purified drinking water is introduced in the cool water producing device, the warm water producing device and the ice producing device, whereby drinking water or ice can be served in a desired state.

We claim:

1. A drinking water purifying apparatus comprising:
   means for producing an ozonized gas;
   means for contacting said ozonized gas with water to be treated, whereby said ozonized gas reacts with said water so as to purify said water; and
   means positioned between said ozone gas purifying means and said connecting means for converting said ozonized gas to a sterilized gas having a low ozone concentration and for contacting said purified water with said sterilized gas having a low ozone concentration.

2. The apparatus of claim 1, wherein said means for converting said ozonized gas to a sterilized gas and for contacting said purified water with said sterilized gas comprise:
   ozone decomposing means;
   means for passing ozonized gas from said ozonized gas producing means through said ozone decomposing means to produce a sterilized gas having a low ozone concentration; and
   means for delivering said sterilized gas to said water to be treated.

3. The apparatus of claim 1, including:
   ozone reaction containing means;
   means for delivering water to be purified from a water service to said reaction containing means; and
   means for discharging water from said reaction conaining means,
   wherein said means for contacting said ozonized gas with said water to be treated comprises means for delivering said ozonized gas directly to said reaction containing means, whereby said ozonized gas reacts with said water in said reaction containing means.

4. The apparatus of claim 3 including means in one of said delivering means and said discharging means for removing from said water substances which are not easilty removed by contacting of said water with said ozonized gas.

5. The apparatus of claim 3 including at least one of ice producing means, cool water producing means and warm water producing means connected to said discharging means.

6. The apparatus of claim 3 including blower means for supplying air to said ozonized gas producing means.

7. The apparatus of claim 3 including means for supplying oxygen to said ozonized gas producing means.

8. The apparatus of claim 3 including:
   a water storage tank connected to said discharging means for storing purified water discharged from said reaction containing means; and
   means for supplying to said purified water in said water storage tank, unreacted ozone at a controlled rate controlled such that a dissolved ozone concentration of said purified water in said water storage tank is between 0.01 mg/liter and 0.2 mg/liter.

9. The apparatus of claim 3 including a single tank having a partition means dividing the interior of said tank into said ozone reaction containing means and at least one water storage tank, said discharging means comprising means connecting said reaction containing means with said at least one water storage tank, wherein at least one of said at least one water storage tanks has water temperature adjusting means therein.

10. The apparatus of claim 9 wherein said water temperature adjusting means comprises a water heater.

11. The apparatus of claim 9 wherein said water temperature adjusting means comprises a water cooler.

12. The apparatus of claim 9 including two of said water storage tanks, wherein one of said water storage tanks has a water heater and the other of said water storage tanks has a water cooler.

13. The apparatus of claim 3, wherein said means for converting said ozonized gas to a sterilized gas and for contacting said purified water with said sterilized gas:
   ozone decomposing means;
   means for passing ozonized gas from said ozonized gas producing means through said ozone decomposing means to produce a sterilized gas having a low ozone concentration; and
   means for delivering said sterilized gas to said water to be treated.

* * * * *